Figure 1:
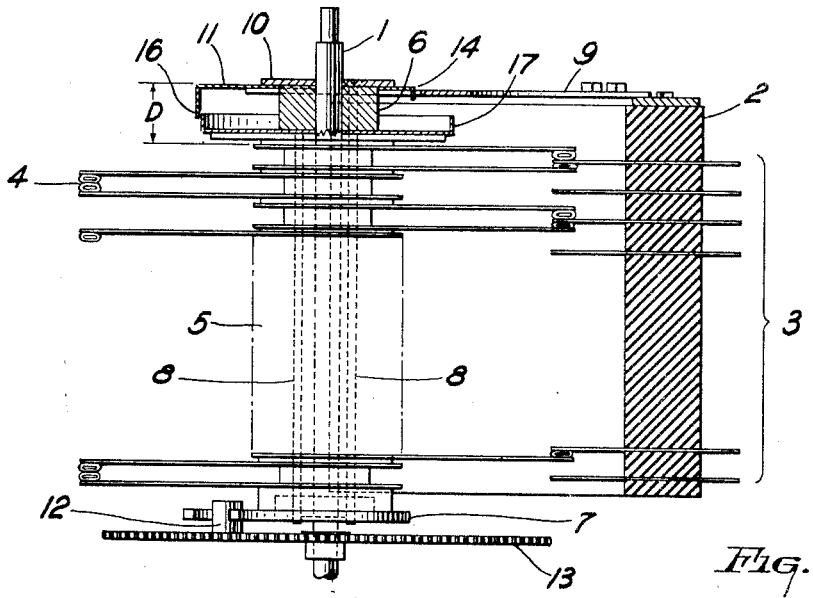

Dec. 21, 1954   N. SCHEFFER   2,697,753
SELECTOR SWITCH, MORE PARTICULARLY FOR AUTOMATIC
TELEPHONY COMPRISING A WIPER CARRIAGE
ROTATABLE ABOUT A VERTICAL SHAFT
Filed May 20, 1950

INVENTOR.
NICOLAAS SCHEFFER
BY
AGENT.

United States Patent Office 2,697,753
Patented Dec. 21, 1954

2,697,753

SELECTOR SWITCH, MORE PARTICULARLY FOR AUTOMATIC TELEPHONY COMPRISING A WIPER CARRIAGE ROTATABLE ABOUT A VERTICAL SHAFT

Nicolaas Scheffer, Hilversum, Netherlands, assignor to Hartford National Bank and Trust Company, Hartford, Conn., as trustee Application May 20, 1950, Serial No. 163,114

Claims priority, application Netherlands June 25, 1949

2 Claims. (Cl. 179—27.51)

The present invention relates to selector switches and more particularly to selector switches for automatic telephony, comprising a wiper carriage rotatable about a vertical shaft.

It is known to construct selector switches including a great number of contact positons, such as selectors for automatic telephone systems, from a substructure, a wiper carrier rotatable about a shaft and mechanically driven, and a contact bank, generally of semi-cylindrical shape, for the stationary contacts. The wiper carrier is supported by a shaft which also carries the driving means for this carrier such, for example, as a coupling tooth gear. In assembling the switch it is of importance that the wipers, i. e. the movable contacts, should be at the correct level, so that each of them is exactly in line with a series of stationary contacts.

The correct position of the wiper carrier is of particular importance where each wiper consists of two contact springs which engage the opposite sides of the stationary contacts. If the carrier is not positioned correctly, the contact pressure of the two contact springs co-operating with the same stationary contact is not equal and one of the springs may not even engage the stationary contact. This would lead to excessive wear of the operated contact spring whereas the other spring would not contribute to the desired reduction of the total transition resistance.

In such selector switches this disadvantage may readily be obviated, if the rotary shaft of the wiper carrier is horizontal. By providing a certain amount of play for the shaft of the wiper carrier in its longitudinal direction the carrier adjusts itself automatically in the correct position. The situation is different however for selector switches comprising a vertical wiper carrier. In this case automatic correct adjustment of the wiper carrier is not possible, any play in the support of the shaft being neutralised by the natural weight of the wiper carrier, so that the position of the wiper carrier is no longer determined by a uniform distribution of the contact pressure between the contact springs and the stationary contacts. Hence, in building up such a switch, it is required that the wiper carrier and the contact bank should be relatively adjusted to the correct level. Since in positioning the wiper carrier its coupling with the driving means must be taken into account, this frequently comes down to the adjustment of the level of the contact bank in accordance with the size of the wiper carrier, its coupling with the driving means and the support for its shaft.

This gives rise to the disadvantage that in a selector of this structure the wiper carrier, in general, cannot readily be replaced by another. The tolerances in the assembling of the wiper carrier itself and of its support and particularly of the relative spacings between the wiper holder and the driving means provided on the shaft are such that, after exchange of a wiper carrier, the initially correct position of the wiper carrier appears to be lost. The contact bank may then be adjusted again, it is true, but it will be obvious that this requires much time and hence is costly, more particularly since this repositioning for the most part cannot be effected unless the switch has been partially dismounted.

The invention, which relates to such a switch comprising a wiper carrier rotatable about a vertical shaft, has for its object to provide a construction wherein exchanging the wiper carrier is readily possible and which at the same time affords other advantages.

According to the invention, this object is attained by a structure in which the top end of the wiper carrier is rotatably suspended in a supporting member which is directly secured to the contact bank. The position of the wiper carrier relative to the contact bank is thus no longer determined by the support for the wiper carrier in the frame of the switch as well as the position of the contact bank relative to this frame, but directly and in the first place by the supporting member connecting the wiper carrier and the contact bank. Since the supporting member engages the top end of the wiper carrier, the driving means being normally arranged at the bottom thereof, the wipers can readily be arranged, with very small tolerances, in predetermined positions measured from the top end of the system. The desired possibility of exchange of the wiper carrier is thus ensured in a very simple manner, since, when replacing the wiper carrier by another, the wipers of the latter owing to the suspension in the supporting member, take up the same positions relative to the contact bank, as the corresponding wipers of the removed wiper carrier.

In one preferred embodiment of the switch according to the invention, the wiper carrier is provided at the top end with a shoulder, which bears, in the mounted position, on the bifurcated end of a supporting member of sheet material, which is secured on top of the contact bank. The spacings between the lower edge of the shoulder and the successive wipers may readily be made equal for all wiper carriers of the same kind. The bifurcated supporting member, which may, for example, be manufactured by a punching process, facilitates removal of the wiper carrier. Between the lower edge of the shoulder and the upper side of the supporting member at the area at which it supports the wiper carrier, provision is preferably made of a loose annular plate, which is locked against rotation with the wiper carrier. The function of this plate is to avoid as much as possible wear of the upper surface of the supporting member which might change the adjustment of the suspended wiper carrier. If the wear is considerable, the supporting member may be maintained and substitution of the loose annular plate is only required to ensure again correct adjustment of the wipers relative to the stationary contacts of the contact bank.

According to the invention, the supporting member may be advantageously constructed in a manner such that the part supporting the wiper carrier is adjustable in a direction corresponding to the direction of the shaft of the wiper carrier. This adjustability may be effected within the means with which the supporting member is secured to the contact bank. However, it is simpler and less costly to make the supporting member of sheet material, the thickness of the material and the shape of the member being such that the part supporting the wiper carrier is adjustable in the axial direction by permanent deformation of the member. It is obvious that the rigidity of the supporting member must be such that the adjustment of the wiper carrier is not changed owing to flexion of the supporting member under the action of the weight of the wiper carrier. In assembling the selector, the supporting member is bent in a manner such that, upon introducing the wiper carrier, its wipers come to lie at the correct level. This adjustment need not be altered upon substitution by an identical wiper carrier.

In the case of great differences in the positioning of the driving means on the wiper carrier, it may occur, without taking the necessary precautions, that, upon replacing a wiper carrier by another, the latter takes up the correct position with respect to the contact bank, but that the connection with the shaft driving the wiper carrier cannot be established owing to the driving means being out of engagement. According to the invention, this may be avoided by making the connection between the wiper carrier and the driving means such that the wiper carrier may be axially shifted without the connection becoming disengaged. Such a connection, which may be advantageously realised by means of a catch and a stud extending in the axial direction of the wiper carrier enabling ready removal of the wiper carrier from the switch. It is always possible in assembling a switch according to the invention, by adjustment of the supporting member, to bring the wiper carrier at the correct level relative to the contact bank, without the need of considering the problem as to whether the connection between the wiper carrier and the driving means is established by this adjustment, since owing to the said method of connection, such is always the case through a wide range of adjustment.

According to the invention, if the connection is established by means of a catch and a stud, the catch may be provided with an adjustable member, which is adjustable transversely to the stud and which avoids any play in the direction of rotation of the wiper carrier, without the freedom of movement of the wiper carrier in an axial direction being hindered.

In order that the invention may be more clearly understood and readily carried into effect, it will now be described in detail with reference to the accompanying drawing, showing, by way of example, one embodiment of a switch according to the invention constructed in the form of a rotary selector for automatic telephone system.

Figure 2:
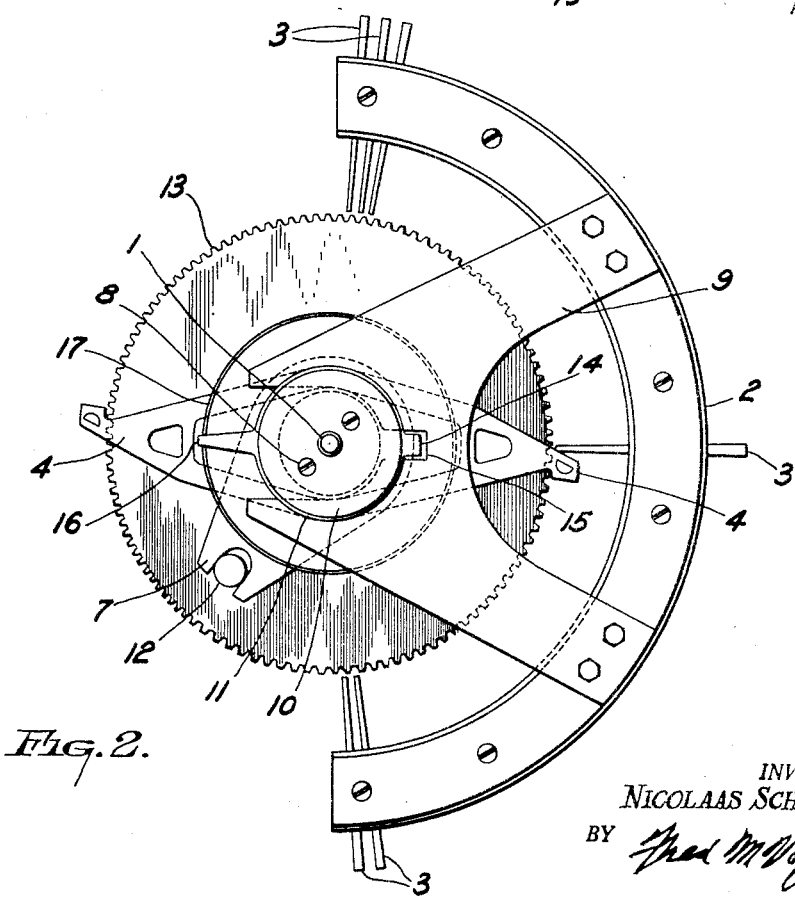

Fig. 1 is a lateral view of the selector, some parts being shown in section, and Fig. 2 is a plan view of the selector.

The substructure of the selector (not shown) houses a vertical central shaft 1 and a semi-cylindrical contact bank 2, which is coaxial with this shaft. The bank 2 comprises a number of horizontal series of spaced stationary contacts 3, each of which is wiped by a set of wipers 4 projecting from a wiper carrier 5. Wiper carrier 5 is constituted by the assembly obtained by stacking the wipers with intermediate rings. At the opposite ends of the carrier 5 there is provided a shoulder piece 6 and a catch 7. By means of screws 8 extending in a longitudinal direction (Fig. 2), the wiper assembly is compressed between shoulder piece 6 and catch 7 and united to form one assembly. The wiper carrier 5 can rotate freely about the shaft 1 and is adjustable along this shaft in an axial direction. The carrier is suspended from a supporting member 9, which is secured to the upper side of contact bank 2. The supporting member embraces the shoulder piece 6 in the manner of a fork, and the shoulder 10 of this shoulder piece bears on this fork with the interposition of a loose annular plate 11.

The wiper carrier is coupled with a driving mechanism (not shown) by means of a catch stud 12 secured to a tooth gear 13. Tooth gear 13 is disposed on shaft 1 and may either be immovably secured to this shaft or adapted to rotate freely about this shaft. The connection between the driving tooth gear 13 and the wiper carrier 5 by means of the catch stud 12 and the catch 7 permits an axial movement of the wiper carrier relative to the tooth gear 13, while any play between these parts in the direction of rotation may be at a minimum. This is advantageous, since the contact positions of the wiper carrier are thus always well defined.

The wiper carrier 5 must be positioned such that the two contact springs of each set of wipers 4 engage the corresponding stationary contacts with approximately equal pressure. The supporting member 9 is made of comparatively thin sheet material and is furthermore cut out so that this member may be deformed whereby the fork supporting the wiper carrier lies at the level required for correct positioning of the carrier. If the wiper carrier is then suspended in the fork, the wipers automatically find the stationary contacts exactly opposite to them. Within certain limits it is immaterial where the tooth gear 13 is provided on the shaft 1. The stud and catch connection between the tooth gear and the wiper carrier is such that it is not necessary to maintain a given spacing between the tooth gear 13 and the bottom of the wiper carrier. This has the great advantage that it is now possible to replace the wiper carrier by another of the same kind, without the need of further adjustment since, as the wiper carrier is suspended at the top side and the distance D of each wiper system (i. e. the spacing between the lower edge of the shoulder 10 and the upper wiper of the carrier) may readily be made identical for each wiper system without any appreciable additional cost, the wipers invariably take up the correct positions relative to the stationary contacts, after the supporting member has been adjusted, irrespective of which wiper carrier is concerned.

It appears from the embodiment described that the wiper carrier is given a fixed position relative to the contact bank with which it must cooperate. By utilising a connection between the driving means and the wiper carrier which permits an axial play and even removal of the wiper carrier, the relative positioning of the wiper carrier and the contact bank is the only factor that must be considered in assembling the selector.

A loose annular washer 11, which is provided between the lower side of the shoulder 10 and the upper side of the fork of the supporting member 9, serves to prevent the upper side of the fork from being worn out. Washer 11 is provided with a downwardly bent tag 14, which extends into a recess 15 of the supporting member 9. The washer is thus locked against rotation with the wiper carrier. Furthermore, washer 11 is provided, on the open side of the selector with a pointer shaped extension 16, of which the downwardly bent end, together with a figure drum 17 associated with the wiper carrier serves as a position indicator of the wiper carrier.

What I claim is:

1. A selector switch adapted for use in automatic telephone systems comprising a vertically disposed rotatable shaft, a wiper carrier mounted on said shaft and provided with wiper contacts and with a shoulder piece at the upper end thereof, a contact bank disposed coaxially with respect to said shaft and provided with stationary contacts to be engaged by said wiper contacts, a plate-shaped supporting member having one end thereof bifurcated to form a pair of fingers, the other end of said member being affixed to said bank, said fingers extending under said shoulder piece to suspend said carrier, a loose annular washer on said shaft interposed between said shoulder piece and said supporting member, said piece and said member being cooperatively provided with coupling means preventing rotation of said washer upon rotation of said carrier, and a drum secured to said carrier, said washer being further provided with a bent pointer-shaped extension disposed cooperatively with said drum so as to constitute a position indicator for said carrier.

2. A selector switch, as set forth in claim 1, further including means for adjusting the position of the fingers of said supporting member to vary the axial position of the suspended carrier.

References Cited in the file of this patent

UNITED STATES PATENTS

| Number | Name | Date |
|---|---|---|
| 1,636,170 | Chaplin | July 19, 1927 |
| 1,693,027 | Erickson | Nov. 27, 1928 |
| 1,882,981 | Schreiber et al. | Oct. 18, 1932 |
| 1,886,059 | Smith et al. | Nov. 1, 1932 |
| 2,194,051 | Muller | Mar. 19, 1940 |

FOREIGN PATENTS

| Number | Country | Date |
|---|---|---|
| 61,716 | Holland | Aug. 17, 1948 |
| 406,840 | Great Britain | Mar. 8, 1934 |